US010675566B2

(12) United States Patent
Banju et al.

(10) Patent No.: US 10,675,566 B2
(45) Date of Patent: Jun. 9, 2020

(54) FILTRATION FILTER DEVICE

(71) Applicant: Murata Manufacturing Co., Ltd., Nagaokakyo-shi, Kyoto-fu (JP)

(72) Inventors: Masaru Banju, Nagaokakyo (JP); Junko Watanabe, Nagaokakyo (JP); Takashi Kondo, Nagaokakyo (JP); Shogo Tokoi, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/174,711

(22) Filed: Oct. 30, 2018

(65) Prior Publication Data

US 2019/0060799 A1 Feb. 28, 2019

Related U.S. Application Data

(63) Continuation of application No. PCT/JP2017/025936, filed on Jul. 18, 2017.

(30) Foreign Application Priority Data

Aug. 10, 2016 (JP) ................................ 2016-158018

(51) Int. Cl.
*B01D 29/05* (2006.01)
*B01D 46/00* (2006.01)
(Continued)

(52) U.S. Cl.
CPC ......... *B01D 29/05* (2013.01); *B01D 46/0005* (2013.01); *B01D 46/0012* (2013.01);
(Continued)

(58) Field of Classification Search
CPC .. B01D 29/05; B01D 63/087; B01D 46/0012; B01D 46/0005; B01D 46/10;
(Continued)

(56) References Cited

U.S. PATENT DOCUMENTS 4,678,576 A 7/1987 Leoncavallo
5,139,031 A 8/1992 Guirguis
(Continued)

FOREIGN PATENT DOCUMENTS

JP S5861439 A 4/1983
JP S6173054 A 4/1986
(Continued)

OTHER PUBLICATIONS

International Search Report issued in PCT/JP2017/025936, dated Oct. 24, 2017.
(Continued)

*Primary Examiner* — Madeline Gonzalez
(74) *Attorney, Agent, or Firm* — Arent Fox LLP

(57) ABSTRACT

A filtration filter device that enables the sealability of a fluid channel to be improved is provided. A filtration filter device according to the present invention includes a first channel-forming member that has a first channel through which a fluid flows inside thereof, a second channel-forming member that has a second channel through which a fluid flows inside thereof, and a filtration filter that extends across the first channel or the second channel and that filters an object to be filtered that the fluid contains. The first channel-forming member includes an external thread. The second channel-forming member includes an internal thread. The first channel-forming member and the second channel-forming member have respective inclined surfaces that incline with respect to a screw direction in which the external thread is screwed into the internal thread at positions nearer than the external thread and the internal thread to the first channel or the second channel, and the inclined surfaces are in contact with each other with the external thread screwed in the internal thread such that the first channel and the second channel are in communication with each other.

12 Claims, 14 Drawing Sheets

(51) Int. Cl.
*B01D 46/10* (2006.01)
*B01D 63/08* (2006.01)

(52) U.S. Cl.
CPC ............ *B01D 46/10* (2013.01); *B01D 63/087* (2013.01); *B01D 2201/4092* (2013.01); *B01D 2265/028* (2013.01); *B01D 2265/06* (2013.01)

(58) Field of Classification Search
CPC ...... B01D 2265/028; B01D 2201/4092; B01D 2265/06
USPC .................................. 210/445, 435, 439, 446
See application file for complete search history.

(56) References Cited

U.S. PATENT DOCUMENTS

2003/0192363 A1* 10/2003 Adiletta ............... B01D 46/543 73/28.04
2016/0041075 A1 2/2016 Kamba et al.
2016/0054223 A1 2/2016 Kamba et al.

FOREIGN PATENT DOCUMENTS

| | | |
|---|---|---|
| JP | H0225006 U | 2/1990 |
| JP | H06500403 A | 1/1994 |
| JP | H0889720 A | 4/1996 |
| JP | H08304370 A | 11/1996 |
| JP | 2007304016 A | 11/2007 |
| JP | 201498661 A | 5/2014 |
| WO | 2014192917 A1 | 12/2014 |

OTHER PUBLICATIONS

Written Opinion of the International Searching Authority issued in PCT/JP2017/025936, dated Oct. 24, 2017.

* cited by examiner

FILTRATION FILTER DEVICE

CROSS REFERENCE TO RELATED APPLICATIONS

The present application is a continuation of International application No. PCT/JP2017/025936, filed Jul. 18, 2017, which claims priority to Japanese Patent Application No. 2016-158018, filed Aug. 10, 2016, the entire contents of each of which are incorporated herein by reference.

TECHNICAL FIELD

The present invention relates to a filtration filter device that filters an object in a fluid.

BACKGROUND OF THE INVENTION

Such a filtration filter device is disclosed in Japanese Unexamined Patent Application Publication No. 2007-304016 (Patent Document 1) and includes a filtration filter that filters an object to be filtered from a fluid, and a housing member that has an interior space in which the filtration filter is disposed. Fluid flows through the interior space. The housing member includes a disk-like base member and a case member that has a recessed portion defining the interior space on a lower surface side and a lower end portion that engages an outer circumferential portion of the base member.

In the filtration filter device disclosed in Patent Document 1, it is difficult to process engagement portions between the base member and the case member with high precision. Accordingly, a liquid can leak to the outside from a fluid channel through the engagement portions, or external gas can enter the fluid channel from the outside through the engagement portions. There is a possibility that an object to be filtered is adversely affected depending on the kind of the external gas.

One possible way to prevent such a leak is to seal a gap between the engagement portions with, for example, rubber packing. Such a solution, however, increases the number of components of the filtration filter device. In addition, when the object to be filtered is, for example, a biological substance, there is a possibility that the rubber packing will adversely affect the biological substance.

Accordingly, from perspective of improvement in sealability of the fluid channel, the existing filtration filter device leaves room for improvement.

It is an object of the present invention to solve the above problem and provide a filtration filter device that enables the sealability of the fluid channel to be improved.

BRIEF DESCRIPTION OF THE INVENTION

The filtration filter device filters an object contained in a fluid.

In accordance with a preferred embodiment of the invention, the device includes a first channel-forming member that has (a) a first channel through which the fluid can pass, (b) an external thread helically extending about a first axis, and (c) a first inclined surface which is inclined with respect to the first axis. The first inclined surface is closer to the first channel than the internal thread. The device further includes a second channel-forming member that has (a) a second channel through which the fluid can pass, (b) an internal thread helically wound about a second axis, and (c) a second inclined surface which is inclined with respect to the second axis. The second inclined surface is closer to the second channel than the external thread. The internal and external threads cooperate with one another such that when the internal thread is screwed into the external thread to connect the first and second channel-forming members to one another (a) the first and second axes align, (b) the first and second fluid channels are in fluid communication with one another and (c) the first and second inclined surfaces are in contact with each other. The device further includes a filtration filter that extends across one of the first or second channels and filters the object when the fluid passes through the filtration filter.

In accordance with an aspect of the invention, a gap is formed between the external thread and the second channel-forming member as measured along the aligned first and second axes.

According to a second aspect of the invention, a second gap is formed between the internal thread and the first channel-forming member as measured along the aligned first and second axes.

According to another aspect of the invention, the filtration filter includes a metallic porous film that filters the object. The object is preferably a biological substance.

In a preferred embodiment, at least one of the first and second channel-forming members is a holding member that holds an outer circumferential portion of the filtration filter.

In a preferred embodiment, the first and second channels are coaxial with one another along a flow axis of the fluid.

The filtration filter device according to the present invention enables the sealability of the fluid channel to be improved.

DETAILED DESCRIPTION OF THE PREFERRED EMBODIMENTS

First Embodiment

Figure 1:
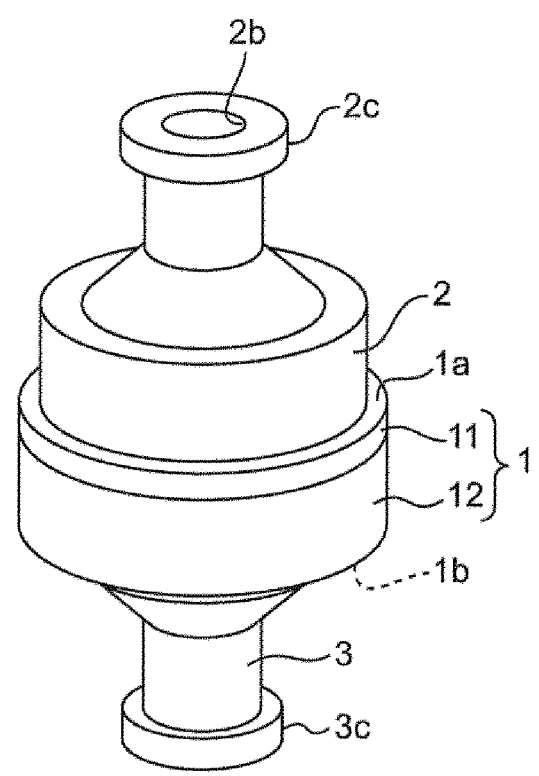
FIG. 1 schematically illustrates a perspective view of the structure of a filtration filter device according to a first embodiment of the present invention.
Figure 2:
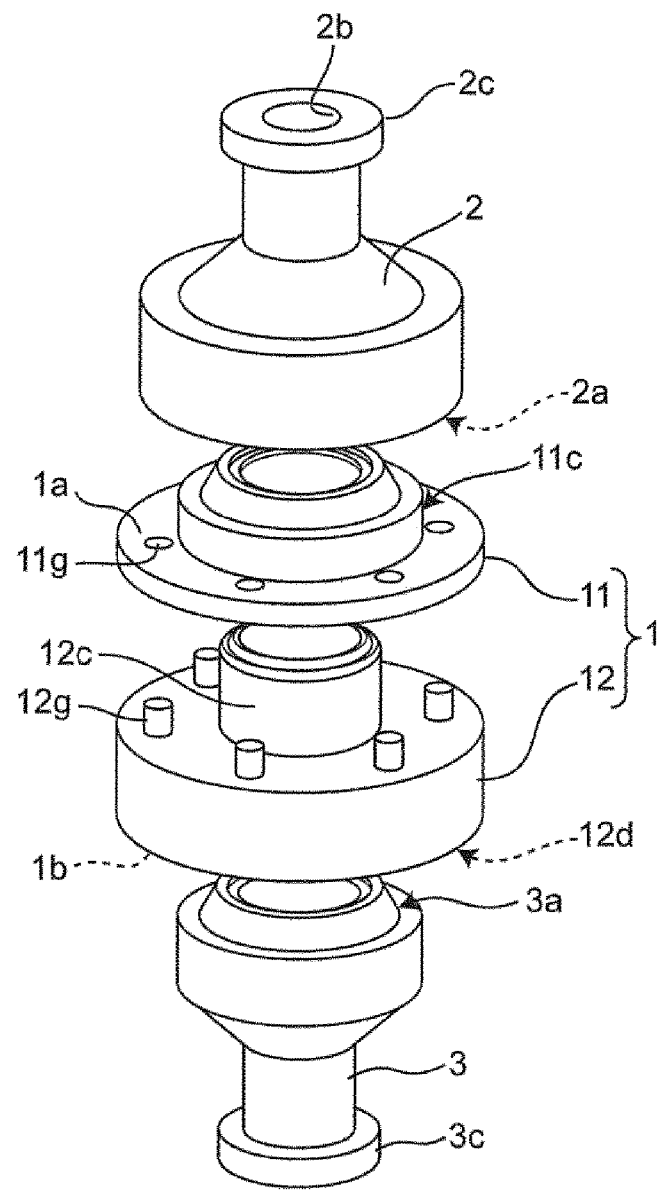
FIG. 2 is an exploded perspective view of the filtration filter device in FIG. 1.

Referring now to the drawing wherein like numerals indicate like elements, there is shown in FIGS. 1-11 a first embodiment of the present invention. As best shown in FIG. 1 and FIG. 2, the filtration filter device includes a holding member 1, a tubular member 2 that is removably mounted on one main surface 1a of the holding member 1, and a tubular member 3 that is removably mounted on the other main surface 1b of the holding member 1.

Figure 3:
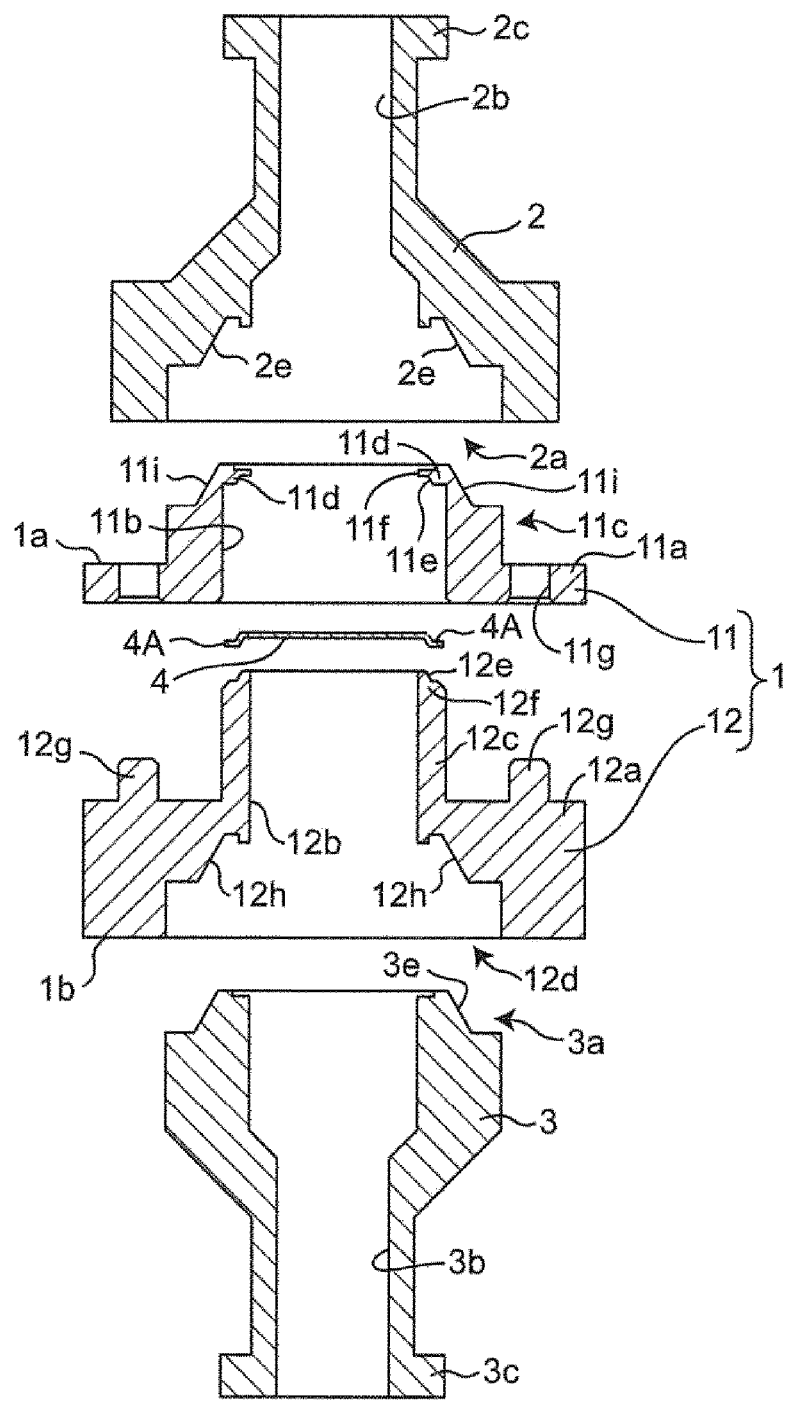
FIG. 3 is an exploded perspective view of a section of a part of the filtration filter device in FIG. 1.
Figure 4:
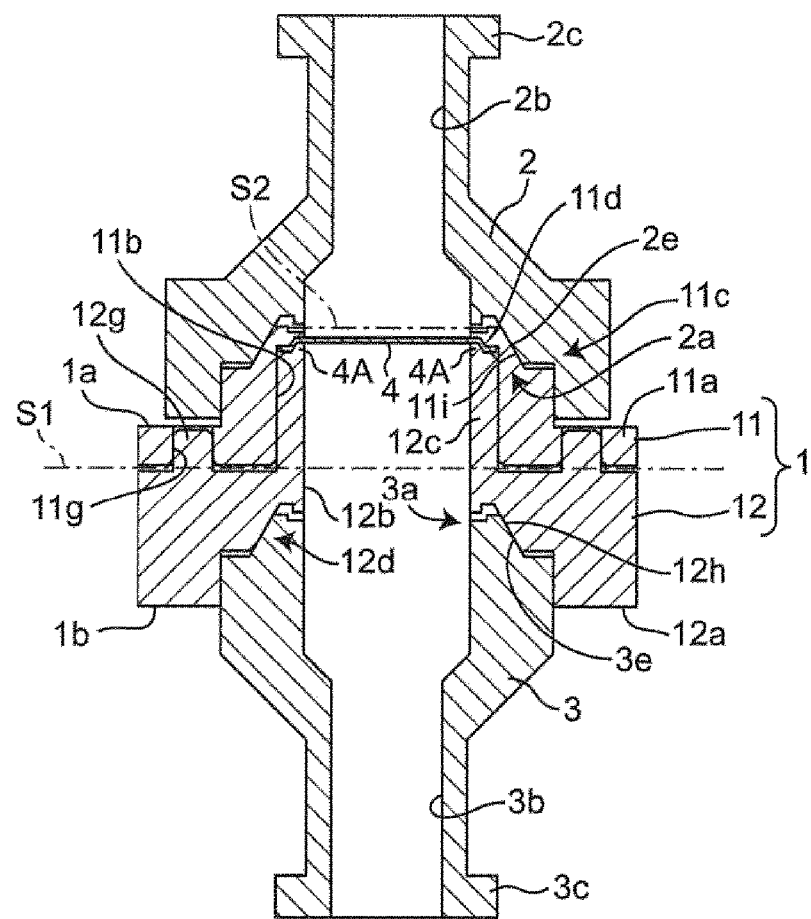
FIG. 4 is a sectional view of an assembly of the filtration filter device in FIG. 1.

As best illustrated in FIG. 3 and FIG. 4, the holding member 1 holds an outer circumferential portion 4A of a filtration filter 4 that filters an object to be filtered from a fluid sample. According to the first embodiment, the holding member 1 includes a first frame member 11 and a second frame member 12. The first frame member 11 and the second frame member 12 are capable of interposing the outer circumferential portion 4A of the filtration filter 4 therebetween.

More specifically, the first frame member 11 includes an annular flat plate 11a and an annular projecting portion 11c that projects toward the tubular member 2 in the thickness direction of the holding member 1 (i.e., in the vertically upward direction as viewed in FIGS. 3 and 4) around a central through-hole 11b. The diameter of the flat plate 11a is, for example, 18 mm. The thickness of the flat plate 11a is, for example, 0.9 mm. The diameter of the through-hole 11b is, for example, 8 mm. The height of the projecting portion 11c is, for example, 4.1 mm. The projecting portion 11c has an inclined surface 11i described in detail below.

An annular flange 11d projects toward the center of the through-hole 11b and is formed on the inner surface of the annular projecting portion 11c. The flange 11d is formed, for example, at a position 0.2 mm away from the top of the projecting portion 11c toward the flat plate 11a in the thickness direction of the holding member 1. The thickness of an end portion 11f of the flange 11d on the center side of the through-hole 11b decreases such that the flange 11d has an inclined surface 11e on the side facing the tubular member 3. The thickness of a portion of the flange 11d near the projecting portion 11c is, for example, 0.5 mm. The thickness of the end portion 11f of the flange 11d is, for example, 0.2 mm. The inclination angle of the inclined surface 11e is, for example, 60 degrees.

The second frame member 12 includes an annular flat plate 12a, an annular projecting portion 12c that projects toward the tubular member 2 in the thickness direction (i.e., vertically upward as viewed in FIGS. 3 and 4) of the holding member 1 around a central through-hole 12b, and a recessed portion 12d that is recessed toward the tubular member 2 in the thickness direction of the holding member 1 around the central through-hole 12b. The diameter of the flat plate 12a is, for example, 18 mm. The thickness of the flat plate 12a is, for example, 4.9 mm. The diameter of the through-hole 12b is, for example, 6 mm. The height of the projecting portion 12c is, for example, 4.65 mm.

The projecting portion 12c has an outer diameter that is slightly smaller than the diameter of the through-hole 11b such that the projecting portion 12c can be inserted in the through-hole 11b of the first frame member 11. The shape of an end portion 12f of the projecting portion 12c matches the shape of the flange 11d on the side facing the tubular member 3. That is, the end portion 12f has an inclined surface 12e that corresponds to the inclined surface 11e.

Figure 5:
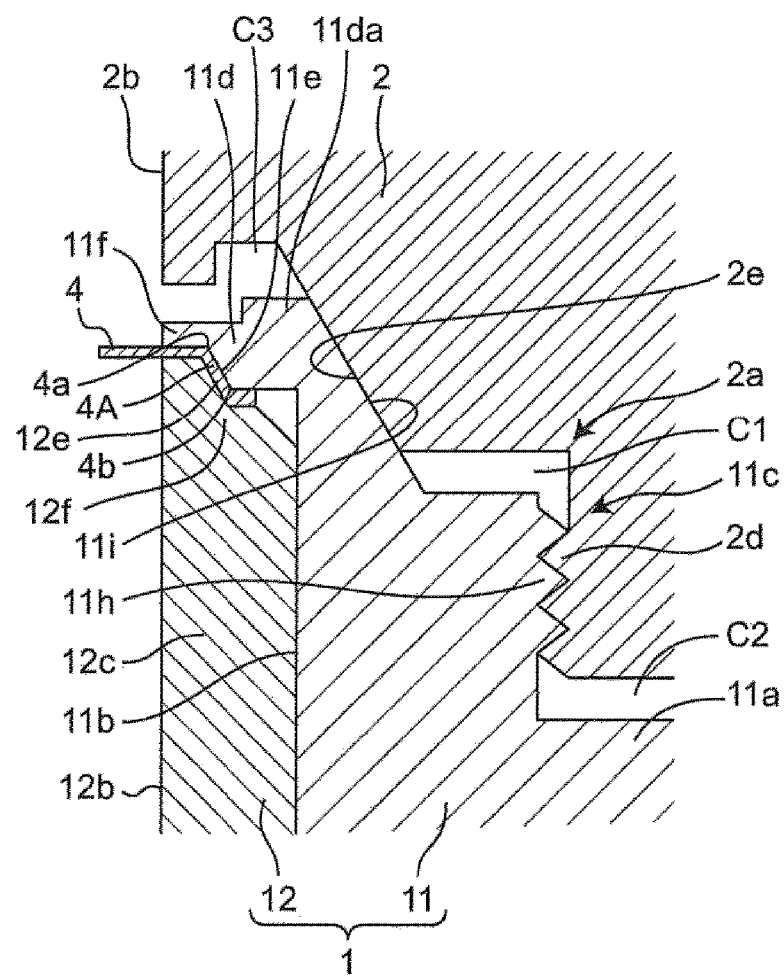
FIG. 5 is an enlarged sectional view of a part of FIG. 4.

As illustrated in FIG. 5, the filtration filter 4 is held with a tensile force applied thereto in a surface direction in a manner in which the outer circumferential portion 4A of the filtration filter 4 is interposed between the flange 11d of the first frame member 11 and the end portion 12f of the projecting portion 12c of the second frame member 12 and extends along the inclined surface 11e and the inclined surface 12e. The outer circumferential portion 4A of the filtration filter 4 is interposed at a position away from a central plane S1 (FIG. 4) of the holding member in the thickness direction of the holding member 1 (i.e., in the vertical direction as viewed in FIG. 4). According to the first embodiment, the filtration filter 4 is disposed inside the annular projecting portion 11c. The filtration filter 4 is substantially flush with an opening plane S2 that is defined by the end portion of the annular projecting portion 11c.

As illustrated in FIGS. 3 and 4, the flat plate 11a of the first frame member 11 has through-holes 11g, each of which extends through the flat plate 11a in the thickness direction. The through-holes 11g are arranged at regular intervals in the circumferential direction of the flat plate 11a. Similarly, the flat plate 12a of the second frame member 12 has pins 12g, each of which projects in the thickness direction. The pins 12g are arranged at regular intervals in the circumferential direction of the flat plate 12a so as to correspond on a one to one basis to the through-holes 11g. The projecting portion 12c of the second frame member 12 is inserted into the through-hole 11b of the first frame member 11, and the pins 12g are inserted into the respective through-holes 11g. Thus, the first and second frame members 11 and 12 are secured to each other.

The tubular member 2 includes a recessed portion 2a that can be removably mounted on the projecting portion 11c of the first frame member 11. The recessed portion 2a has an inner diameter larger than the inner diameter of the projecting portion 11c. The tubular member 2 includes a hollow portion 2b that serves as a fluid channel. The tubular member 2 is mounted on the first frame member 11 such that the hollow portion 2b faces at least a part of one main surface of the filtration filter 4. This enables the fluid to be supplied to the filtration filter 4 via the hollow portion 2b that serves as a fluid supply channel. Alternatively, fluid that has passed through the filtration filter 4 can be discharged via the hollow portion 2b that serves as a fluid discharge channel.

As best illustrated in FIG. 5, an internal thread 2d is formed on the inner circumferential surface of the recessed portion 2a of the tubular member 2. The recessed portion 2a of the tubular member 2 has an inclined frustoconical surface (sometimes referred to below as an inclined inner circumferential surface) 2e at a position nearer than the internal thread 2d to the channel (hollow portion 2b). An external thread 11h that corresponds to the internal thread 2d is formed on the outer circumferential surface of the projecting portion 11c of the first frame member 11. The projecting portion 11c of the first frame member 11 has the inclined frustoconical surface (sometimes referred to below as the inclined outer circumferential surface) 11i at a position nearer to a channel (through-hole 12b) than the external thread 11h. The inclined inner circumferential surface 2e and the inclined outer circumferential surface 11i incline with respect to a screw direction (axial direction) in which the external thread 11h is screwed into the internal thread 2d.

The inclined inner circumferential surface 2e and the inclined outer circumferential surface 11i are tapered. The inclined inner circumferential surface 2e has an outer diameter smaller than that of the internal thread 2d so as to be surrounded by the internal thread 2d when viewed in the axial direction. The inclined outer circumferential surface 11i has an outer diameter smaller than that of the external thread 11h so as to be surrounded by the external thread 11h when viewed in the axial direction. As illustrated in FIG. 5, the inclined outer circumferential surface 11i of the projecting portion 11c of the first frame member 11 and the inclined inner circumferential surface 2e of the recessed portion 2a of the tubular member 2 are in contact with each other with the external thread 11h screwed in the internal thread 2d. The inclination angle of the inclined inner circumferential surface 2e and the inclined outer circumferential surface 11i is, for example, 60 degrees.

Gaps C1 and C2 are formed between the internal thread 2d and the tubular member 2 in the screw direction (vertical direction in FIG. 5) and between the external thread 11h and the first frame member 11 in the screw direction with the external thread 11h screwed in the internal thread 2d.

The tubular member 2 preferably includes a Luer lock connector 2c having a form that meets a standard such as ISO594-2. According to the first embodiment, the connector 2c is formed of an annular projecting portion that projects outward from an end portion of the tubular member 2. For example, the tubular member 2 is mounted on a Luer lock syringe in a manner in which the connector 2c is screwed along a spiral groove (not illustrated) that is formed on the inner circumferential surface of a hollow end portion of the Luer lock syringe.

As best shown in FIGS. 3 and 4, the tubular member 3 includes a projecting portion 3a that can be removably mounted on the recessed portion 12d of the second frame member 12. The recessed portion 12d has an inner diameter that is larger than the inner diameter of the projecting portion 3a. The tubular member 3 includes a hollow portion 3b that serves as a fluid channel. The tubular member 3 is mounted on the second frame member 12 such that the hollow portion 3b faces at least a part of the other main surface (i.e., the lower surface as viewed in FIGS. 3 and 4) of the filtration filter 4. This enables the fluid to be supplied to the filtration filter 4 via the hollow portion 3b. Alternatively, fluid that has passed through the filtration filter 4 can be discharged from the hollow portion 3b.

The tubular member 3 includes a Luer lock connector 3c that has a form that meets a standard such as ISO594-2. According to the first embodiment, the connector 3c is formed of an annular projecting portion that projects outward from an end portion of the tubular member 3. For example, the tubular member 3 is mounted on a Luer lock syringe in a manner in which the connector 3c is screwed along a spiral groove (not illustrated) that is formed on the inner circumferential surface of a hollow end portion of the Luer lock syringe.

By way of example, the first frame member 11, the second frame member 12 and the tubular members 2 and 3 can be made of metals such as duralumin and aluminum and resins such as polyethylene, polystyrene, polypropylene, polycarbonate, polyacetal, and polyetherimide.

In a typical application of the filtration filter device of the first embodiment, the object to be filtered is a biological substance contained in a liquid. As sued herein, a "biological substance" is one derived from a living organism such as a cell (eukaryote), a bacterium (eubacteria), and a virus. Examples of the cell (eukaryote) include an ovum, a spermatozoon, an induced pluripotent stem cell (iPS cell), an ES cell, a stem cell, a mesenchymal stem cell, a mononuclear cell, a single cell, a cell mass, a floating cell, an adhesion cell, a nerve cell, a leukocyte, a lymphocyte, a cell for regenerative medicine, an autologous cell, a cancer cell, a circulating tumor cell (CTC), HL-60, HELA, and fungi. Examples of the bacterium (eubacteria) include a colon bacillus and a tubercle bacillus.

Figure 6:
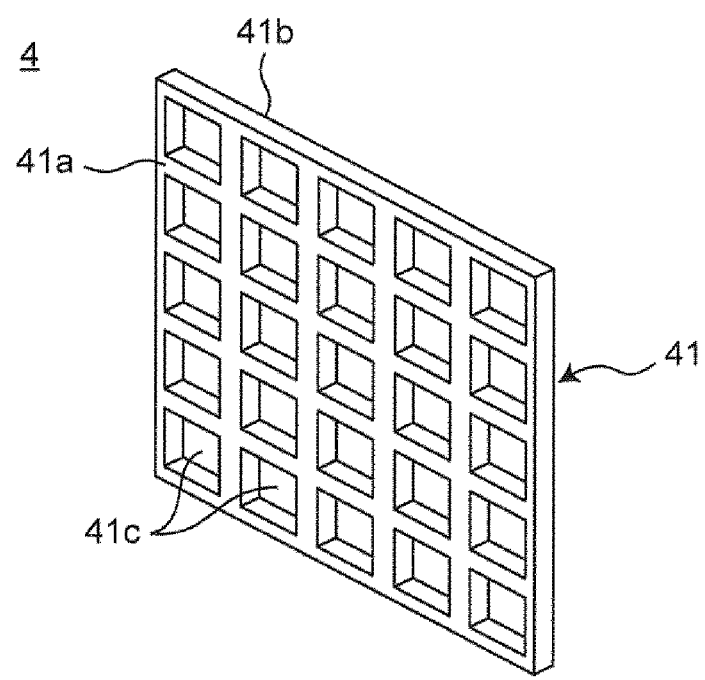
FIG. 6 schematically illustrates an enlarged perspective view of the structure of a part of a filtration filter.

FIG. 6 schematically illustrates an enlarged perspective view of a square sub-area of the larger area of the circular filtration filter 4. As illustrated in FIG. 6, the filtration filter 4 includes a metallic porous film 41 that filters the object to be filtered that the fluid contains.

The metallic porous film 41 has a pair of opposed main surfaces 41a and 41b and through-holes 41c that extend between (and through) the main surfaces 41a and 41b. The through-holes 41c isolate biological substances from the liquid. The shape and dimensions of each through-hole 41c are appropriately determined in accordance with the shape and size of the biological substances to be isolated. The through-holes 41c are arranged, for example, at regular intervals or in a periodical manner. For example, the shape of each through-hole 41c can be a square, a regular hexagon, a circle, or an ellipse when viewed from the main surface 41a of the metallic porous film 41. According to the first embodiment, the through-holes 41c are arranged in the form of a square lattice. The size of each through-hole 41c is, for example, no less than 0.1 μm and no more than 500 μm in length and no less than 0.1 μm and no more than 500 μm in width when the shape of the through-hole 41c is a square. The distance between the adjoining through-holes 41c is, for example, more than the diameter of the opening of each through-hole 41c and is equal to or less than 10 times the diameter of the opening, and is more preferably equal to or less than 3 times the diameter of the opening. An opening ratio of the through-holes 41c to the metallic porous film 41 is, for example, 10% or more.

Examples of the material of the metallic porous film 41 include gold, silver, copper, platinum, nickel, stainless steel, palladium, titanium, cobalt, an alloy thereof, and an oxide thereof. The dimension of the metallic porous film 41 is, for example, 6 mm in diameter. The thickness of the metallic porous film 41 is, for example, no less than 0.1 μm and no more than 100 μm, preferably no less than 0.1 μm and no more than 50 μm. The shape of the metallic porous film 41 is, for example, circular, elliptic, or polygonal. According to the first embodiment, the shape of the metallic porous film 41 is circular. An outer circumferential portion of the metallic porous film 41 may have the through-holes 41c and may not have the through-holes 41c.

According to the first embodiment, and as illustrated in FIG. 5, the external thread 11h is formed on the outer circumferential surface of the projecting portion 11c of the holding member 1, and the internal thread 2d is formed on the inner circumferential surface of the recessed portion 2a of the tubular member 2. The inclined outer circumferential surface 11i of the projecting portion 11c of the holding member 1 and the inclined inner circumferential surface 2e of the recessed portion 2a of the tubular member 2 are in contact with each other with the external thread 11h screwed into the internal thread 2d. With this structure, the holding member 1 and the tubular member 2 can be removably mounted to each other with more certainty in a manner in which the external thread 11h is screwed into the internal thread 2d. Since the inclined outer circumferential surface 11i of the projecting portion 11c of the holding member 1 and the inclined inner circumferential surface 2e of the recessed portion 2a of the tubular member 2 are in contact with each other, the contact area can be larger than that in the case where surfaces that are perpendicular to the screw direction are in contact with each other. With this structure, even when the accuracy of the manufacturing processing is the same as the case where the perpendicular surfaces are in contact with each other, the area of close contact between the projecting portion 11c of the holding member 1 and the recessed portion 2a of the tubular member 2 can be substantially increased and the sealability of the fluid channel can be further improved. In the case of this structure, the holding member 1 acts as a first channel-forming member, and the through-hole 12b of the holding member 1 acts as a first channel. The filtration filter 4 extends across the first channel. The tubular member 2 acts as a second channel-forming member and the hollow portion 2b of the tubular member 2 acts as a second channel.

According to the first embodiment, the gap C1 is formed between the external thread 11h and the tubular member 2 in the screw direction (i.e., vertically as viewed in FIG. 5) with the external thread 11h screwed in the internal thread 2d. The gap C1 makes it possible to increase an amount in which the external thread 11h is screwed into the internal thread 2d with the inclined outer circumferential surface 11i and the inclined inner circumferential surface 2e being in contact with each other. Consequently, the inclined outer circumferential surface 11i and the inclined inner circumferential surface 2e are in contact with each other at an increased pressure. As a result, the area of close contact between the tubular member 2 and the holding member 1 is increased and the sealability of the fluid channel can be further improved.

As illustrated in FIG. 5, the gap C2 and a gap C3 are preferably formed between the internal thread 2d and the holding member 1 in the screw direction. The gaps C2 and C3 make it possible to avoid a situation where the amount in which the external thread 11h is screwed into the internal thread 2d cannot be increased due to contact between the internal thread 2d and the holding member 1 or contact between the flange 11d and the tubular member 2. When the external thread 11h is screwed into the internal thread 2d, it can be assumed that the inclined inner circumferential surface 2e and the inclined outer circumferential surface 11i are tightly in close contact with each other in a manner in which it is recognized that the amount of screwing cannot be increased with the gap C2 formed. In the case where the size of the gap C2 or the gap C3 is larger than the predetermined size of the gap when the amount of screwing cannot be increased, it can be assumed that there is a possibility that a foreign substance is in the gap C1 or plural filtration filters 4 are interposed between the first frame member 11 and the second frame member 12. In the case where the gap C2 or the gap C3 disappears when the amount of screwing can be increased, it can be assumed that there is a possibility that a space is formed between the inclined inner circumferential surface 2e and the inclined outer circumferential surface 11i or no filtration filter 4 is interposed between the first frame member 11 and the second frame member 12. A step 11da formed on the flange 11d increases the contact area between the inclined outer circumferential surface 11i and the inclined inner circumferential surface 2e, improves the sealability, and enables the gap C3 to be formed.

An internal thread (not shown) may be formed on the inner circumferential surface of the recessed portion 12d (FIG. 4) of the holding member 1, and an external thread (not shown) may be formed on the outer circumferential surface of the projecting portion 3a of the tubular member 3 similar to the internal and external threads shown in FIG. 5. Like the connecting structures shown in FIG. 5, the recessed portion 12d of the holding member 1 and the projecting portion 3a of the tubular member 3 may have respective inclined surfaces that incline with respect to the screw direction in which the external thread is screwed into the internal thread at positions nearer than the internal thread and the external thread to the channel, and the inclined surfaces may be in contact with each other. With this structure, the holding member 1 and the tubular member 3 can be removably mounted with more certainty in a manner in which the external thread is screwed into the internal thread. Since the inclined surface of the recessed portion 12d of the holding member 1 and the inclined surface of the projecting portion 3a of the tubular member 3 are in contact with each other, the contact area can be larger than that in the case where surfaces that are perpendicular to the screw direction are in contact with each other. With this structure, even when the accuracy of processing is the same as the case where the perpendicular surfaces are in contact with each other, the area of close contact between the recessed portion 12d of the holding member 1 and the projecting portion 3a of the tubular member 3 can be substantially increased, and the sealability of the fluid channel can be further improved. In the case of this structure, the holding member 1 acts as a second channel-forming member, and the through-hole 12b of the holding member 1 acts as a second channel. The filtration filter 4 extends across the second channel. The tubular member 3 corresponds to the first channel-forming member, and the hollow portion 3b of the tubular member 3 corresponds to the first channel.

Also similar to FIG. 5, a gap may be formed between the external thread and the holding member 1 in the screw direction with the external thread screwed into the internal thread. The gap makes it possible to increase an amount in which the external thread is screwed into the internal thread with the inclined surfaces being in contact with each other. Consequently, the inclined surfaces are in contact with each other at an increased pressure, the area of close contact between the tubular member 3 and the holding member 1 is further increased, and the sealability of the fluid channel can be further improved. Similarly, a gap may be formed between the internal thread 2d and the tubular member 3 in the screw direction. The gap makes it possible to avoid a situation where the amount of screwing cannot be increased due to contact between the internal thread and the tubular member 3. It can be assumed that the inclined surfaces are tightly in close contact with each other and that a foreign substance is between the external thread and the holding member 1 in a manner in which the size of the gap is checked.

According to the first embodiment, since the sealability of the fluid channel can be further improved, the filtration filter 4 can include the metallic porous film 41 that is capable of filtering a biological substance that corresponds to the object to be filtered. The metallic porous film 41 enables both of its main surfaces to be inhibited or prevented from having irregularities, and focus can be more readily adjusted when the object filtered and left on the filtration filter 4 is observed with, for example, an electron microscope.

Figure 7:
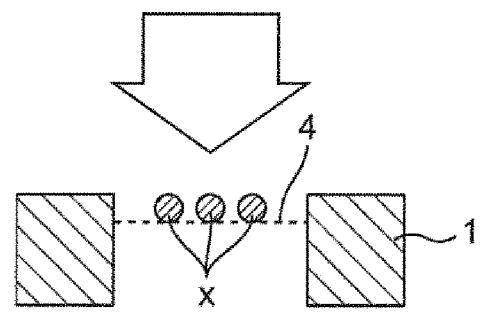
FIG. 7 schematically illustrates a side view of the filtration filter that is held on a fluid supply side by a holding member and that filters an object to be filtered that a fluid contains.
Figure 8:
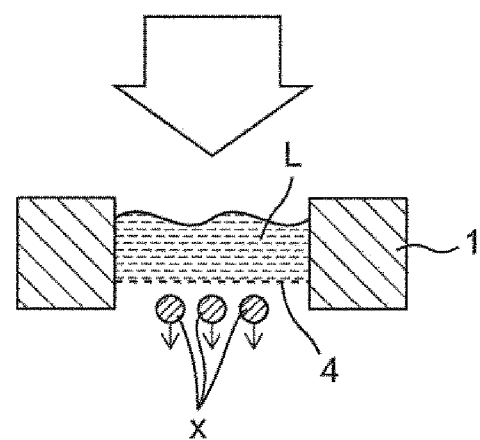
FIG. 8 schematically illustrates a side view of the filtration filter illustrated in FIG. 7 and illustrates backwashing in which a liquid is caused to flow in an opposite direction toward the object filtered by the filtration filter.
Figure 9:
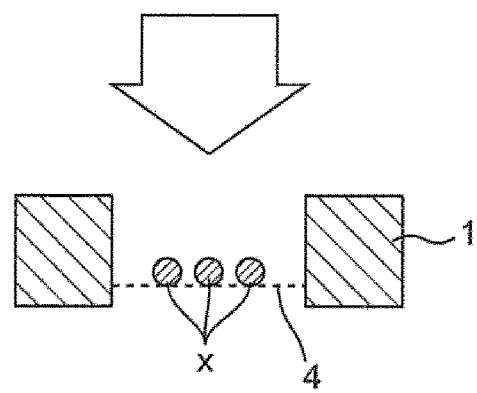
FIG. 9 schematically illustrates a side view of the filtration filter that is held on a fluid discharge side by the holding member and that filters an object to be filtered that a fluid contains.
Figure 10:
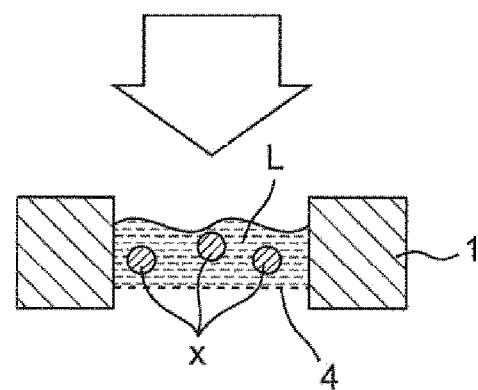
FIG. 10 schematically illustrates a side view of the filtration filter illustrated in FIG. 9 and illustrates the object to be filtered that floats in a liquid that enters a space surrounded by the filtration filter and the holding member.

According to the first embodiment, as illustrated in FIG. 4, the filtration filter 4 is located between the projecting portions 11c and 12c of the holding member 1. Accordingly, the filtration filter 4 is spaced from the central plane S1 as measured in the thickness direction of the holding member 1 (i.e., vertically as viewed in FIG. 4) and is located on either the fluid supply side or discharge side. That is, in the case where the fluid channel that is defined by the projecting portions 11c and 12c of the holding member 1 is the fluid supply channel, the filtration filter 4 is located on the fluid supply side. With this structure, as illustrated in FIG. 7, the focus of an electron microscope or the like used to observe filtered objects x left on the filtration filter 4 can be more readily adjusted. As illustrated in FIG. 8, this structure is also advantageous for backwashing in which a fluid is caused to flow in an opposite direction toward the objects x filtered and left on the filtration filter 4 and subsequently, the objects are removed from the filtration filter 4. In the case where the fluid channel that is defined by the projecting portions 11c and 12c of the holding member 1 is the fluid discharge channel, the filtration filter 4 is located on the fluid discharge side. As illustrated in FIG. 9, a space that is surrounded by the holding member 1 and the filtration filter 4 can be expanded. With this structure, as illustrated in FIG. 10, an increase in the amount of a liquid L enables the filtered objects x to be observed with more certainty while the objects are immersed in the liquid. Accordingly, better observation can be achieved, for example, by preventing the filtered objects x located on the filtration filter 4 from drying or activation thereof. When the tubular member 2 is removed, the fluid can be inhibited from overflowing from the space, and the filtration filter 4 can filter the object to be filtered with more certainty.

According to the first embodiment, the filtration filter 4 is substantially flush with the opening plane S2 (FIG. 4) that is defined by the end portion of the annular projecting portion 11c. With this structure, the focus of an electron microscope of the like can be more readily adjusted when the filtered object left on the filtration filter 4 is observed. In addition, the volume of the space that is surrounded by the holding member 1 and the filtration filter 4 can be further increased. This enables the filtration filter 4 to filter the object to be filtered with more certainty. The filtration filter 4 may be flush with the opening plane S2. In this case, the same effect as above can be achieved.

According to the first embodiment, the holding member 1 includes first and second frame members 11 and 12 that are capable of interposing (and clamping) the outer circumferential portion 4A of the filtration filter 4 therebetween. With this structure, the filtration filter 4 can be readily replaced after the first frame member 11 and the second frame member 12 are separated from the outer circumferential portion.

According to the first embodiment, the thickness of the flat plate 11a that serves as the outer circumferential portion of the first frame member 11 preferably differs from the thickness of the flat plate 12a that serves as the outer circumferential portion of the second frame member 12. This enables the positions of the projecting portions 11c and 12c and the recessed portion 12d to be checked on the basis of the difference in the thickness between the flat plates 11a and 12a even when the holding member 1 is mounted on the tubular members 2 and 3 and the appearance of the projecting portions 11c and 12c and the recessed portion 12d cannot be recognized visually.

According to the first embodiment, the tubular members 2 and 3 include the Luer lock connectors 2c and 3c. This structure achieves, for example, direct mounting on a Luer lock syringe and improves usability.

Figure 11:
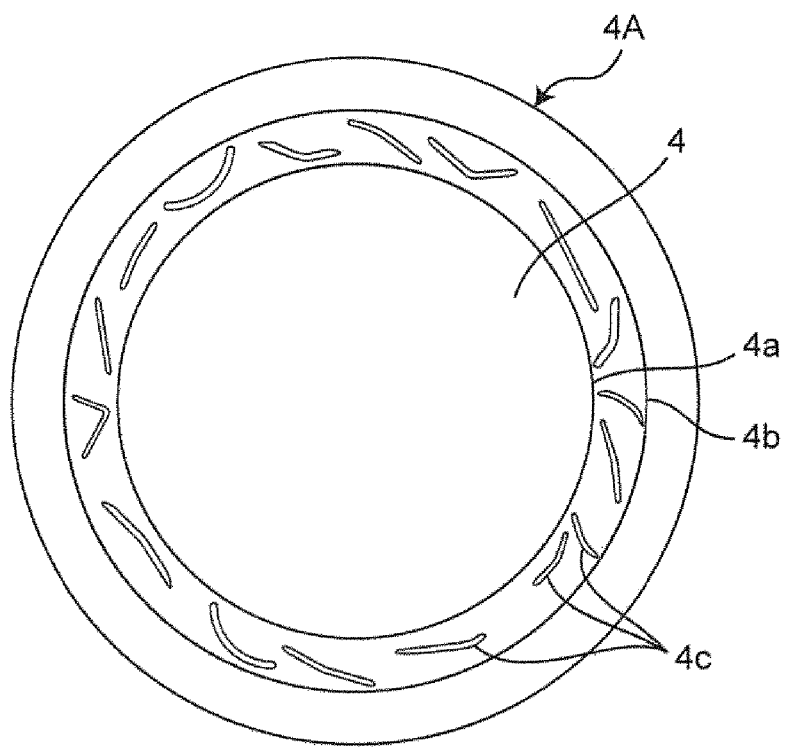
FIG. 11 schematically illustrates a plan view of a filtration filter according to a modification.

According to the first embodiment, as illustrated in FIG. 5, the inclined surface 11e of the first frame member 11 and the inclined surface 12e of the second frame member 12 interpose the outer circumferential portion 4A of the filtration filter 4 such that the outer circumferential portion 4A of the filtration filter 4 has first and second bends 4a and 4b. As illustrated in FIG. 11, the outer circumferential portion 4A of the filtration filter 4 preferably contains striped projections 4c located between the first and second bends 4a and 4b. The striped projections 4c can increase frictional forces between the first frame member 11 and the outer circumferential portion 4A of the filtration filter 4 and between the second frame member 12 and the outer circumferential portion 4A of the filtration filter 4. This increases forces at which the first frame member 11 and the second frame member 12 hold the filtration filter 4 without increasing the number of components. Each striped projection 4c protrudes from the one main surface of the filtration filter 4 and has a height that is preferably no less than about 0.1 times the thickness of the filtration filter 4 and preferably no more than about 2 times the thickness of the filtration filter 4.

As illustrated in FIG. 11, the striped projections 4c are disposed between the first and second bends 4a and 4b and preferably extend in irregular directions. This structure can increase the frictional forces between the first frame member 11 and the outer circumferential portion 4A of the filtration filter 4 and between the second frame member 12 and the outer circumferential portion 4A of the filtration filter 4 and further increase the forces at which the first frame member 11 and the second frame member 12 hold the filtration filter 4.

The striped projections 4c may take the form of wrinkles formed in the metallic porous film 41. The "wrinkles" are preferably fine creases in the outer circumferential portion 4A of the filtration filter 4 that are produced when the metallic porous film 41 becomes loose or shrinks. In this case, the metallic porous film 41 itself can form the striped projections 4c, and there is no need for additional members for the striped projections 4c.

The present invention is not limited to the present embodiment and can be carried out with other embodiments. For example, in the above description, the object to be filtered is the biological substance that the liquid contains. The present invention, however, is not limited thereto. The object to be filtered may be a substance that a gas contains. That is, the object to be filtered may be, for example, PM2.5 that air contains, provided that the object to be filtered is a substance that a fluid contains.

In the above description, the filtration filter 4 is used to filter biological substances from the liquid. The present invention, however, is not limited thereto. For example, the filtration filter 4 may be used to concentrate a liquid.

In the above description, the tubular member 2 is removably mounted on one main surface 1a of the holding member 1. The present invention, however, is not limited thereto. For example, the tubular member 2 may be removably mounted on a side surface of the holding member 1.

Second Embodiment

Figure 12:
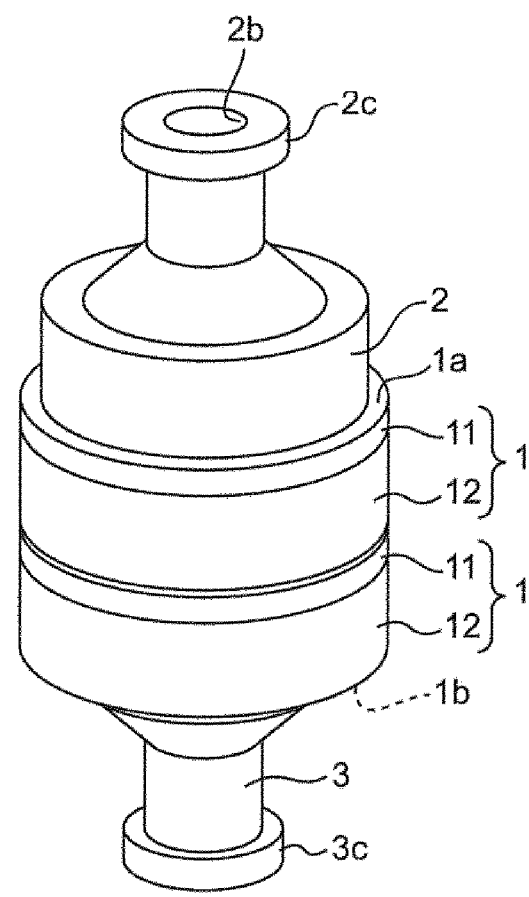
FIG. 12 schematically illustrates a side view of the structure of a filtration filter device according to a second embodiment of the present invention.
Figure 13:
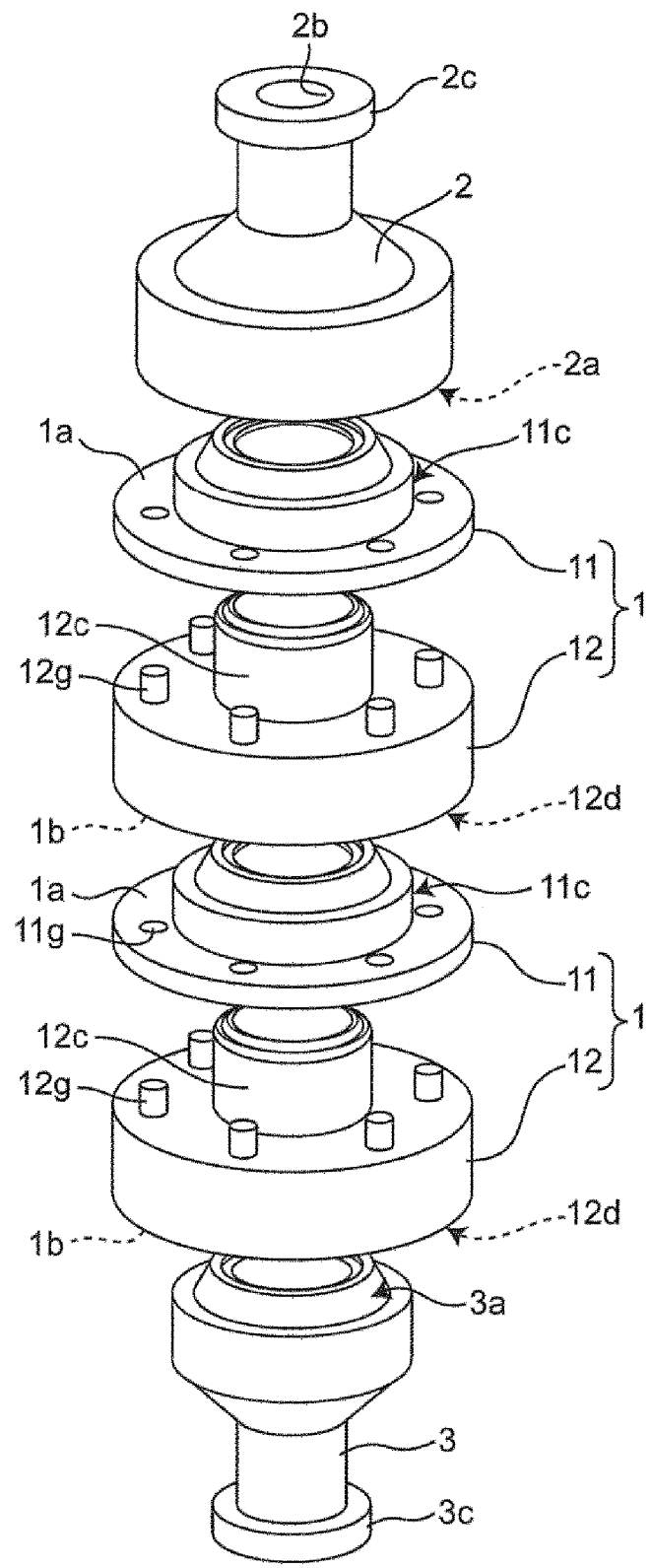
FIG. 13 is an exploded perspective view of the filtration filter device in FIG. 12.

FIG. 12 schematically illustrates a perspective view of the structure of a filtration filter device according to a second embodiment of the present invention. FIG. 13 is an exploded perspective view of the filtration filter device in FIG. 12.

The filtration filter device according to the second embodiment differs from the filtration filter device according to the first embodiment in that it includes a pair of holding members 1. Components like or similar to the components described according to the first embodiment are designated by like reference numbers, and a duplicated description is omitted.

The two holding members 1 are removably mounted on each other. According to the second embodiment, the projecting portion 11c of each of the first frame members 11 has a shape that enables the projecting portion 11c to be mounted on the recessed portion 12d of its associated second frame member 12 (see FIG. 3 and FIG. 4). That is, the projecting portion 11c of the first frame member 11 and the projecting portion 3a of the tubular member 3 have the same shape. The recessed portion 12d of the second frame member 12 and the recessed portion 2a of the tubular member 2 (see FIG. 3 and FIG. 4) have the same shape.

According to the second embodiment, two filtration filters 4 can be readily installed in and removed from the filtration filter device that includes the two holding members 1 that are mountable on and removable from each other, and the usability can be improved. For example, the object to be filtered can be filtered with the two filtration filters 4, and this decreases a variation in the size of the object filtered by one of the two filtration filters 4 that is located on the downstream side in the direction in which the fluid flows. In the case where the diameter of each through-hole is changed between the filtration filters 4 that are held by the holding members 1, objects to be filtered having different sizes can be classified.

According to the second embodiment, since the projecting portion 11c of the first frame member 11 has a shape that enables the projecting portion 11c to be mounted on the recessed portion 12d of the second frame member 12, three or more holding members 1 can be connected in series, for example, in a manner in which the three or more holding members 1 are stacked one on top of the other, and the projecting portion 11c of one of the adjoining holding members 1 is mounted on the recessed portion 12d of the other holding member 1. That is, whether the holding member 1 is used or the holding members 1 that are connected to each other are used can be selected depending on the use. The number and order of the holding members 1 and the kind (for example, the diameter of each through-hole, the opening ratio, and the material) of the filtration filters 4 can be optionally changed depending on the object to be filtered, and the usability can be greatly improved.

According to the second embodiment, as illustrated in FIG. 4, since the filtration filters 4 are located inside the projecting portions 11c and 12c of the holding members 1, the filtration filter 4 that is held by one of the holding members 1 can be prevented from damaging due to contact with the projecting portions 11c and 12c of the other holding member 1 when the holding members 1 are connected in series.

In each of the holding members 1, an external thread may be formed on the outer circumferential surface of the projecting portion 11c and an internal thread may be formed on the inner circumferential surface of the recessed portion 12d, as with the description with reference to FIG. 5. In each of the holding members 1, the projecting portion 11c and the recessed portion 12d may have respective inclined surfaces that incline with respect to the screw direction in which the external thread is screwed into the internal thread at positions nearer than the internal thread and the external thread to the channel, and the inclined surfaces may be in contact with each other. With this structure, the each of the holding members 1 can be removably mounted with more certainty in a manner in which the external thread is screwed into the internal thread. Since the inclined surface of the projecting portion 11c of each of the holding members 1 and the inclined surface of the recessed portion 12d of each of the holding members 1 are in contact with each other, the contact area can be larger than that in the case where surfaces that are perpendicular to the screw direction are in contact with each other. With this structure, even when the accuracy of processing is the same as the case where the perpendicular surfaces are in contact with each other, the area of close contact between the projecting portion 11c of the one of the holding members 1 and the recessed portion 12d of the other holding member 1 can be substantially increased, and the sealability of the fluid channel can be further improved. In the case of this structure, the one of the holding members 1 corresponds to the first channel-forming member, and the through-hole 12b of the one of the holding members 1 corresponds to the first channel. The other holding member 1 corresponds to the second channel-forming member, and the through-hole 12b of the other holding member 1 corresponds to the second channel. The filtration filters 4 extend across the first channel and the second channel.

A gap may be formed between the external thread and the other holding member 1 in the screw direction with the external thread screwed in the internal thread as with the description with reference to FIG. 5. The gap makes it possible to increase the amount in which the external thread is screwed into the internal thread with the inclined surfaces being in contact with each other. Consequently, the inclined surfaces are in contact with each other at an increased pressure, the area of close contact between the one of the holding members 1 and the other holding member 1 is further increased, and the sealability of the fluid channel can be further improved. A gap may be formed between the internal thread and the one of the holding members 1 in the screw direction. The gap makes it possible to avoid a situation where the amount of screwing cannot be increased due to contact between the internal thread and the one of the holding members 1. It can be assumed that the inclined surfaces are tightly in close contact with each other and that a foreign substance is between the external thread and the other holding member 1 in a manner in which the size of the gap is checked.

Third Embodiment

Figure 14:
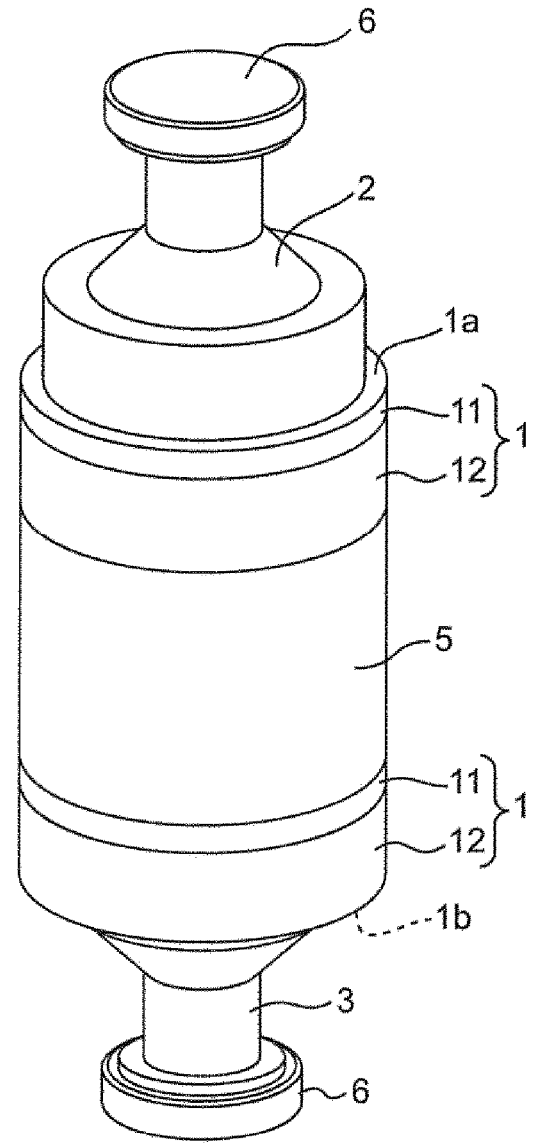
FIG. 14 schematically illustrates a side view of the structure of a filtration filter device according to a third embodiment of the present invention.
Figure 15:
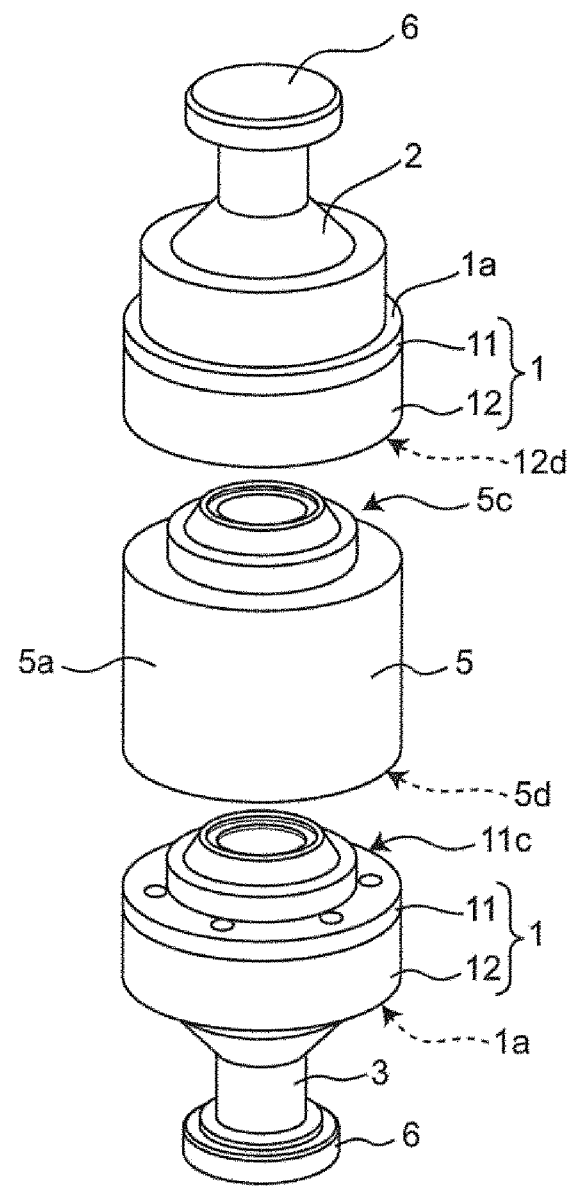
FIG. 15 is an exploded perspective view of a part of the filtration filter device in FIG. 14.
Figure 16:
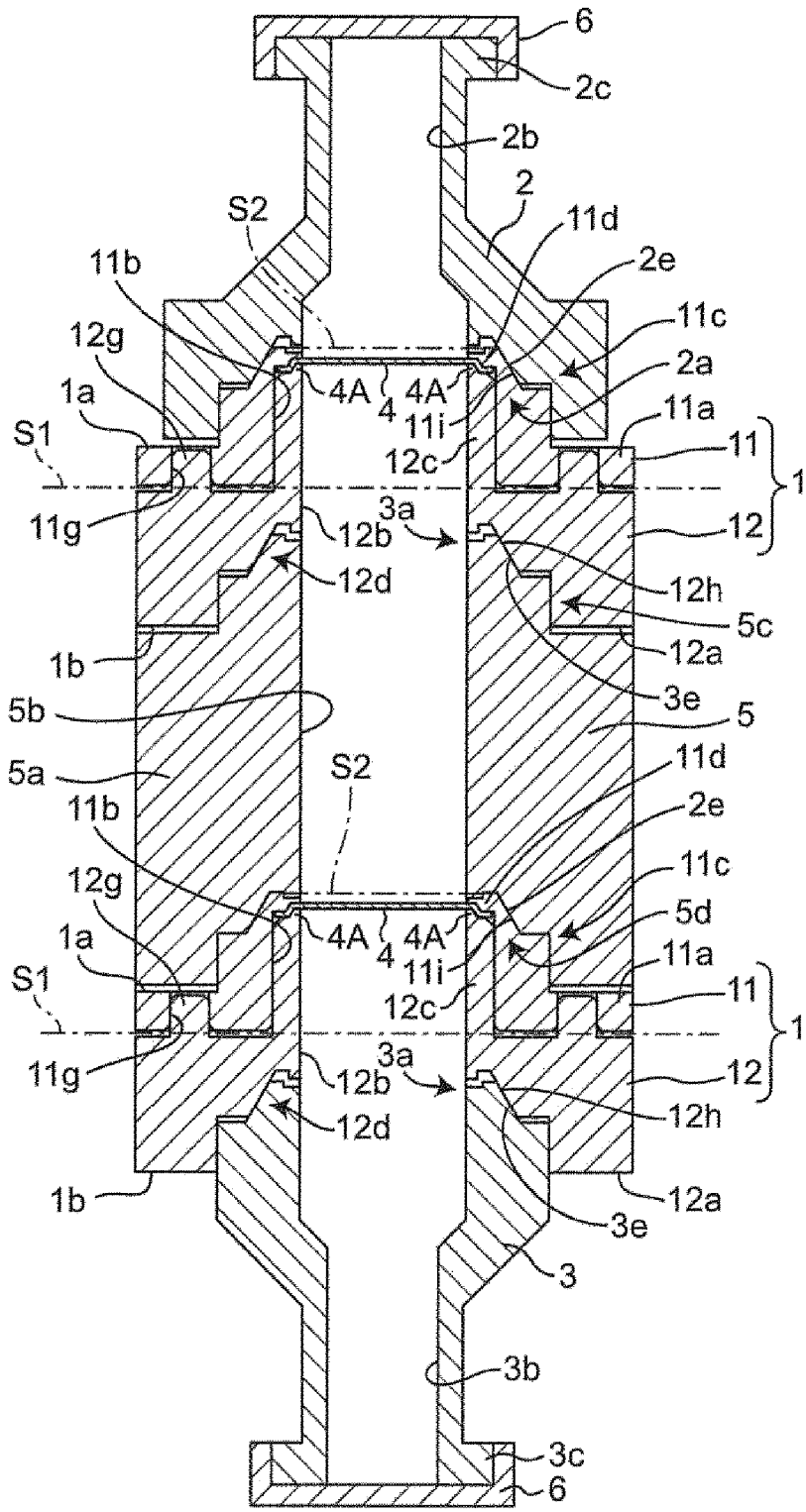
FIG. 16 is a sectional view of the filtration filter device in FIG. 14.

FIG. 14 schematically illustrates a side view of the structure of a filtration filter device according to a third embodiment of the present invention. FIG. 15 is an exploded perspective view of a part of the filtration filter device in FIG. 14. FIG. 16 is a sectional view of the holding member in FIG. 14.

The filtration filter device according to the third embodiment differs from the filtration filter device according to the second embodiment in that a spacer 5 is disposed between the two the holding members 1 and lids 6 are removably mounted on the connectors 2c and 3c of the tubular members 2 and 3. Components like or similar to the components described according to the first embodiment are designated by like reference numbers, and a duplicated description is omitted.

As illustrated in FIG. 14 to FIG. 16, the spacer 5 includes a tubular portion 5a, an annular projecting portion 5c that projects toward one of the holding members 1 around a hollow portion 5b, and a recessed portion 5d that is recessed toward the one of the holding members 1 around the hollow portion 5b. The diameter of the tubular portion 5a is, for example, 18 mm. The thickness (height) of the tubular portion 5a is, for example, 15 mm.

The projecting portion 5c of the spacer 5 has a shape that enables the projecting portion 5c to be mounted on the recessed portion 12d of the second frame member 12 (see FIG. 3 and FIG. 4). That is, the projecting portion 5c of the spacer 5, the projecting portion 11c of the first frame member 11, and the projecting portion 3a of the tubular member 3 have the same shape.

The recessed portion 5d of the spacer 5 has a shape that enables the projecting portion 5d to be mounted on the projecting portion 11c of the first frame member 11 and the projecting portion 3a of the tubular member 3 (see FIG. 3 and FIG. 4). That is, the recessed portion 5d of the spacer 5, the recessed portion 12d of the second frame member 12, and the recessed portion 2a of the tubular member 2 have the same shape.

Examples of the material of the spacer 5 include metals such as duralumin and aluminum and resins such as polyethylene, polystyrene, polypropylene, polycarbonate, polyacetal, and polyetherimide.

According to the third embodiment, the spacer 5 enables the distance between the two holding members 1 (that is, the length of the channel) to be adjusted by the thickness of the spacer. For example, the hollow portion 5b of the spacer 5 can function as a buffer that temporally stores the fluid. The holding members 1 and the spacer 5 are combined depending on the use, and this further improves the usability.

According to the third embodiment, since the lids 6 are mounted on the connectors 2c and 3c of the tubular members 2 and 3, for example, the filtration filter device can be removed from a fluid-supplying apparatus or another apparatus and carried with the fluid contained in the channel. In addition, the object to be filtered that the fluid contains can be diffused for filtering in a manner in which the filtration filter device is shaken in the direction in which the channel extends with the lids 6 mounted on the connectors 2c and 3c of the tubular members 2 and 3. This further improves the usability.

The spacer 5 may not be disposed between the two holding members 1 but may be disposed between the tubular member 2 and the holding members 1 or between the tubular member 3 and the holding members 1.

An appropriate combination of embodiments among the above embodiments can achieve the same effects as the embodiments achieve.

Although the present invention is sufficiently described with reference to the accompanying drawings in relation to the preferred embodiments, various modifications and alterations are obvious for a person skilled in the art. It should be understood that the modifications and alterations are included in the present invention recited by the accompanying claims without departing from the scope of the present invention.

The present invention is useful as a filtration filter device that filters the object to be filtered that the fluid contains, such as biological substances or PM2.5 because the object filtered and left on the filtration filter can be more readily observed.

REFERENCE SIGNS LIST 1 holding member
1a one main surface
1b the other main surface
2 tubular member
2a recessed portion
2b hollow portion
2c connector (Luer lock connector)
2d internal thread
2e inclined surface (inclined inner circumferential surface)
3 tubular member
3a projecting portion
3b hollow portion
3c connector (Luer lock connector)
4 filtration filter
4A outer circumferential portion
4a first bend
4b second bend
4c striped projection
5 spacer
5a tubular portion
5b hollow portion
5c projecting portion
5d recessed portion
6 lid
11 first frame member
11a flat plate
11b through-hole
11c projecting portion
11d flange
11e inclined surface
11f end portion
11g through-hole
11h external thread
11i inclined surface (inclined outer circumferential surface)
12 second frame member
12a flat plate
12b through-hole
12c projecting portion
12d recessed portion
12e inclined surface
12f end portion
12g pin
41 metallic porous film
41a, 41b main surface
41c through-hole

The invention claimed is:

1. A filtration filter device for filtering an object contained in a fluid, the device comprising:
a first channel-forming member that has:
(a) a first channel through which the fluid can pass,
(b) an external thread helically extending about a first axis, and
(c) a first inclined surface which is inclined with respect to the first axis, the first inclined surface being closer to the first channel than the external thread;
a second channel-forming member that has:
(a) a second channel through which the fluid can pass,
(b) an internal thread helically wound about a second axis, and
(c) a second inclined surface which is inclined with respect to the second axis, the second inclined surface being closer to the second channel than the internal thread, the internal and external threads cooperating with one another such that when the internal thread is screwed into the external thread to connect the first and second channel-forming members to one another (a) the first and second axes align, (b) the first and second fluid channels are in fluid communication with one another, and (c) the first and second inclined surfaces are in direct contact with each other; and a filtration filter that extends across one of the first or second channels and filters the object when the fluid passes through the filtration filter.

2. The filtration filter device according to claim 1, wherein, when the internal thread is screwed into the external thread, a gap is formed between the external thread of the first channel-forming member and the second channel-forming member as measured along the aligned first and second axes.

3. The filtration filter device according to claim 2, wherein the gap is a first gap and a second gap is formed between the internal thread of the second channel-forming member and the first channel-forming member as measured along the aligned first and second axes.

4. The filtration filter device according to claim 1, wherein a gap is formed between the internal thread of the second channel-forming member and the first channel-forming member as measured along the aligned first and second axes.

5. The filtration filter device according to claim 1, wherein the filtration filter includes a metallic porous film that filters the object.

6. The filtration filter device according to claim 1, wherein the first channel-forming member holds an outer circumferential portion of the filtration filter.

7. The filtration filter device according to claim 1, wherein the first and second channels are coaxial with one another along a flow axis of the fluid.

8. The filtration filter device according to claim 1, wherein the first inclined surface is closer to the first channel than the external thread as measured in a direction perpendicular to the first axis.

9. The filtration filter device according to claim 8, wherein the second inclined surface is closer to the second channel than the internal thread as measured in a direction perpendicular to the second axis.

10. The filtration filter device according to claim 1, wherein first inclined surface is inclined at an acute angle with respect to the first axis and the second inclined surface is inclined at an acute angle with respect to the second axis.

11. The filtration filter device according to claim 6, wherein the first channel-forming member comprising first and second frame members which cooperate to hold the outer circumferential portion of the filtration filter.

12. The filtration filter device according to claim 11, wherein the first and second frame members are detachable from on another so that the filtration filter can be replaced.

* * * * *